US007032486B1

(12) United States Patent
Mayr et al.

(10) Patent No.: US 7,032,486 B1
(45) Date of Patent: Apr. 25, 2006

(54) RECIPROCATING SAW COMPRISING A PROGRAM-CONTROLLED FEED CONVEYOR FOR ADVANCING THE ITEM TO BE CUT

(75) Inventors: Reinhold Mayr, Waldzell (AT); Franz Diermaier, Taiskirchen (AT)

(73) Assignee: Wintersteiger GmbH, Ried/Innkreis (AT)

( * ) Notice: Subject to any disclaimer, the term of this patent is extended or adjusted under 35 U.S.C. 154(b) by 159 days.

(21) Appl. No.: 09/674,205

(22) PCT Filed: Feb. 28, 2000

(86) PCT No.: PCT/AT00/00052

§ 371 (c)(1), (2), (4) Date: Oct. 27, 2000

(87) PCT Pub. No.: WO00/51795

PCT Pub. Date: Sep. 8, 2000

(30) Foreign Application Priority Data

Mar. 1, 1999 (AT) .................................. A 333/99

(51) Int. Cl.
*B23D 51/04* (2006.01)

(52) U.S. Cl. ......................... 83/225; 83/263; 83/403.1; 83/757

(58) Field of Classification Search .................. 83/757, 83/403.1, 743, 241, 257, 263, 229, 746, 225
See application file for complete search history.

(56) References Cited

U.S. PATENT DOCUMENTS

| | | | | |
|---|---|---|---|---|
| 2,817,375 A | | 12/1957 | Traben | |
| RE28,077 E | * | 7/1974 | Meltzer et al. | 83/101 |
| 4,015,500 A | * | 4/1977 | Stolzer | 83/647 |
| 4,308,852 A | * | 1/1982 | Gebhart | 125/16.01 |
| 4,481,845 A | * | 11/1984 | Sakurai et al. | 83/13 |
| 4,628,459 A | * | 12/1986 | Shinohara et al. | 700/173 |
| 4,644,832 A | * | 2/1987 | Smith | 700/160 |
| 4,707,793 A | * | 11/1987 | Anderson | 700/188 |
| 6,089,135 A | * | 7/2000 | Murray | 83/209 |

FOREIGN PATENT DOCUMENTS

| | | |
|---|---|---|
| DE | 22 43 426 | 3/1973 |
| DE | 34 06 455 | 10/1984 |
| RU | 419375 | 3/1974 |
| RU | 852540 | 8/1981 |
| RU | 1166991 | 1/1984 |
| RU | 1303407 | 3/1985 |
| RU | 2096169 | 10/1992 |
| WO | 90 05050 | 5/1990 |

* cited by examiner

*Primary Examiner*—Kenneth E. Peterson
(74) *Attorney, Agent, or Firm*—Collard & Roe, P.C.

(57) ABSTRACT

The description refers to a mill saw with a saw gate (3) driven via a slider-crank drive (4), whose parallel saw blades (5), which cut in only one stroke direction, are provided with a bias, and with a feed conveyor (6) for the stock to be cut, which is driven intermittently during the cutting stroke of the saw gate (3) as a function of the cutting speed by means of at least one motor (10) separated from the slider-crank drive (4) and connected to a controlling system (12). To achieve favorable construction features, it is suggested that the controlling system (12) connected to a signal transmitter (17) for a preset position of rotation of the slider-crank drive (4) controls the motor (10) in dependence on the response of the signal transmitter (17) according to a stored control program for one conveying step adaptable to the respective stroke frequency of the slider-crank drive (4).

5 Claims, 3 Drawing Sheets

RECIPROCATING SAW COMPRISING A PROGRAM-CONTROLLED FEED CONVEYOR FOR ADVANCING THE ITEM TO BE CUT

CROSS REFERENCE TO RELATED APPLICATIONS

Applicants claim priority under 35 U.S.C. §119 of Austrian Application No. A333/99 filed on Mar. 1, 1999. Applicants also claim priority under 35 U.S.C. §365 of PCT/AT2000/00052 filed on Feb. 28, 2000. The international application under PCT article 21(2) was not published in English.

FIELD OF THE INVENTION

The invention relates to a mill saw with a saw frame driven by a slider-crank drive, whose parallel saw blades, which cut only in one stroke direction, are cantilevered, and with a feed conveyor for the stock to be cut, which is driven intermittently during the cutting stroke of the saw frame as a function of the cutting speed by means of at least one motor separated from the slider-crank drive and connected to a controlling system.

DESCRIPTION OF THE PRIOR ART

To ensure, in spite of the sinusoidal speed gradient, uniform chip thicknesses over the cutting stroke in case of mill saws with a saw frame driven by a slider-crank drive, the saw blades of which cut in only one stroke direction, the feed conveyor for the stock to be cut must be driven intermittently as a function of the cutting speed. To this end it is common practice to derive the feed drive for the feed conveyor from the slider-crank drive, for instance by a ratchet drive, the feeder conveyor for the stock to be cut being connected with the slider-crank drive only during the cutting stroke. As the saw blades are cantilevered in the stroke direction, so that the saw blades are disengaged from the stock to be cut during the return stroke while the feed conveyor is idle, the stock to be cut must first be advanced, by the feed drive towards the saw blades according to the saw blade disengagement, before any cutting engagement can take place. This requires a lead of the feed drive against the cutting stroke of the saw frame, resulting in a phase displacement between the slider-crank drive and the feed drive derived from the slider-crank drive, so that, as a consequence, the cutting speed reaches its maximum only after the feed speed. This circumstance entails irregular chips over the cutting stroke and thus irregular stresses of the saw blades with unfavorable consequences for the service life of the saw blades and for the cutting quality, in particular, when parquet lamellas are to be cut from commercially available stock lumber.

Problems are similar when the feed conveyor for the stock to be cut is equipped with a motor separated from the slider-crank drive of the saw frame that is driven intermittently as a function of the slider-crank drive, for instance by connecting the hydraulic motor of the feed drive intermittently to the pump circuit by a reversing valve (DE 34 06 455 A). Here the reversing valve is controlled by a reversing shaft that is in a driving connection with the slider-crank drive. By intermittently reversing the control valve by the reversing shaft, however, irregular saw blade stress cannot be avoided.

SUMMARY OF THE INVENTION

The invention has therefore the object to design a mill saw of the above mentioned kind in such a way that favorable cutting conditions are ensured to guarantee a long service life of the saw blades at comparatively high cutting rates.

The object of the invention is achieved with a controlling system connected to a signal transmitter for a preset position of rotation of the slider-crank drive and controlling the motor for effectuating a conveying step in dependence on the response of the signal transmitter according to a stored control program adaptable to the stroke frequency of the slider-crank drive.

To achieve, for example, a regular thickness of the saw chips over the cutting stroke that is favorable in terms of saw blade stress, the speed gradient of the feed conveyor must be exactly matched with the gradient of the cutting speed of the saw frame during the cutting stroke after overcoming the saw blade disengagement, which requires a sufficiently accurate motor control, if the feed drive is independent of the slider-crank drive. According to the invention, this accurate motor control is simply achieved in that, contrary to the conventional mechanical drive connection between the slider-crank drive and the feed conveyor, where each angle of rotation of the slider-crank drive is coordinated with an angle of rotation for the motor of the feed drive, the motor is controlled by a controlling system according to a stored control program for a conveying step, so that, for executing such a conveying step of the feed conveyor, it is only required to time the controlling system by the slider-crank drive. To this end a signal transmitter for a preset position of rotation of the slider-crank drive is provided. Due to the inertia of the moving masses the prerequisite for such a control of the driving motor timed by the slider-crank drive, namely that there be only a trifling change of the rotating speed during the cutting stroke of the saw frame, is fulfilled in the case of mill saws. It is only required to adapt the chronological sequence of the stored control program to the respective stroke frequency of the slider-crank drive, which is not difficult at all, as the respective stroke frequency for a given position of rotation of the slider-crank drive is transmitted to the controlling system by the signal transmitter.

Although basically each position of rotation of the slider-crank drive is suitable for timing the controlling system, a particularly favorable construction is achieved if the signal transmitter consists of a sensor for the dead center of the slider-rank drive at the end of the cutting stroke, as in this case the signal transmitter an be easily coordinated with the saw frame guide, without having to provide complex adjustment facilities. The dead center at the end of a cutting stroke makes it possible for the feed drive to begin operating already with the next cutting stroke in spite of the lead necessary for overcoming the saw blade disengagement.

The conveying distance of the stock to be cut for overcoming the saw blade disengagement depends only on the chosen cantilever of the saw blades, and is independent of the stroke frequency of the saw frame. Therefore, the controlling system may be provided with memories for a control program dependent on the speed of the slider-crank drive and one independent thereof, which latter provides for feeding the stock to be cut according to the saw blade disengagement determined by the cantilever of the saw blades. This division of the control program into one part dependent on the stroke frequency of the saw frame and one independent thereof is particularly recommended if the controlling system is connected to an input unit for difference control parameters, via which, for instance, the feed into be varied to adapt to various chip thicknesses.

If the feed drive is provided with two motors separately controllable by the controlling system and arranged in feed direction upstream and downstream of the saw frame, the feed conveyors upstream and downstream of the saw frame may be driven at different speeds, whereby the application of tensile and/or pressure forces to the stock to be cut in the cutting area becomes possible.

BRIEF DESCRIPTION OF THE DRAWING

The drawing depicts an embodiment of the invention.

DESCRIPTION OF THE PREFERRED EMBODIMENT

Figure 1:
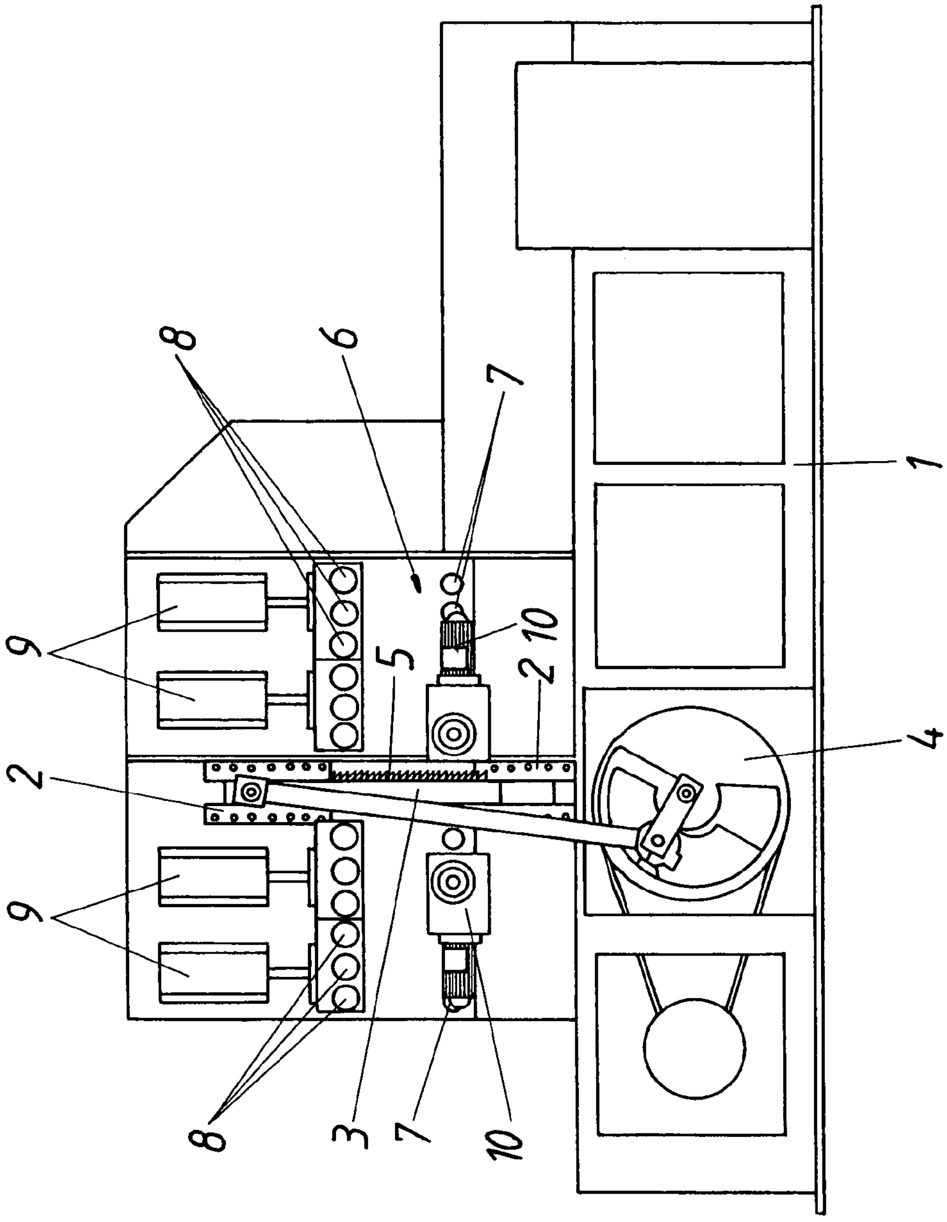
FIG. 1 represents a schematic side view of the mill saw according to the invention.
Figure 2:
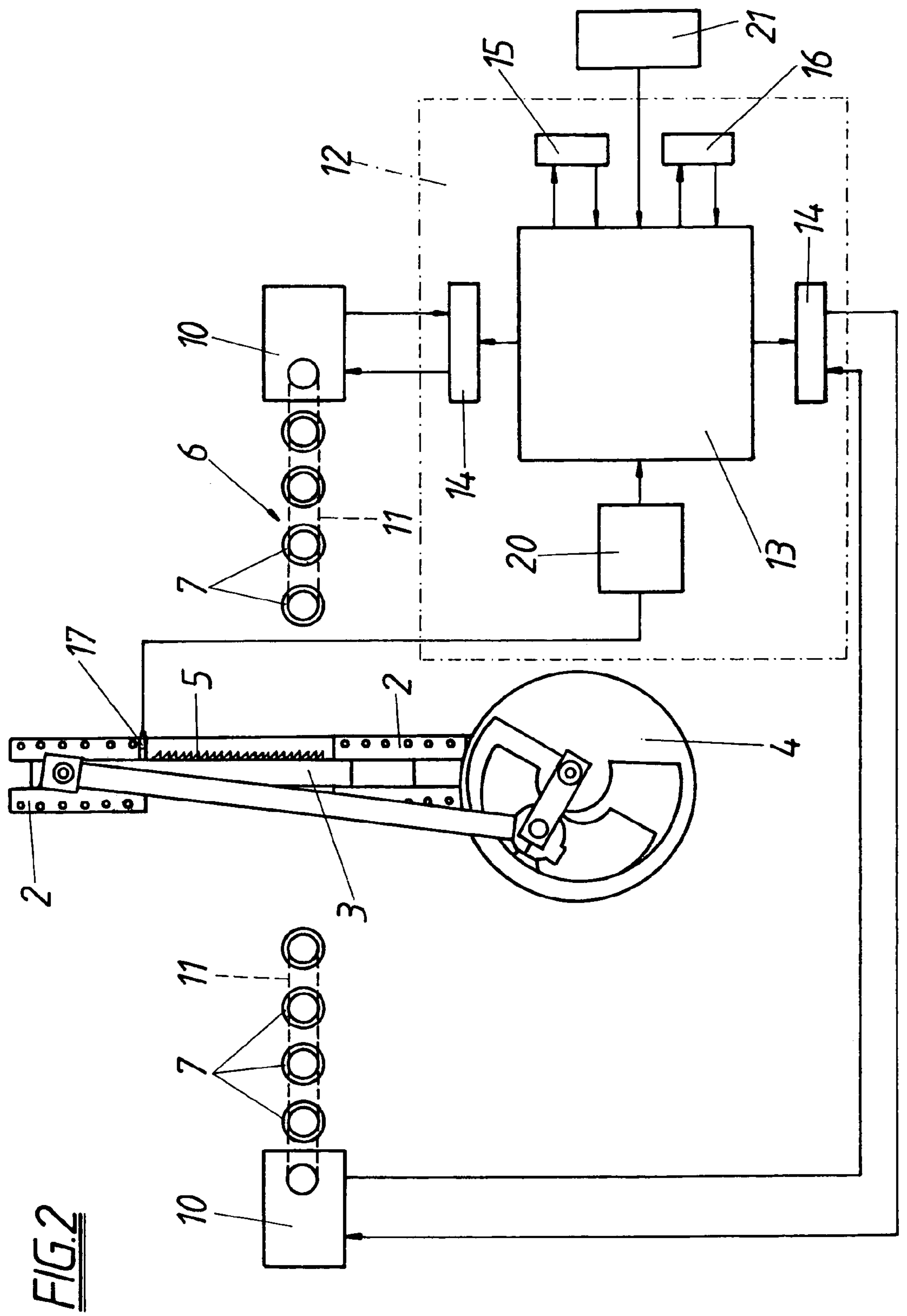
FIG. 2 is a schematic block diagram of the slider-crank drive for the saw frame and the feed drive for the stock to be cut.

In the example of embodiment according to FIG. 1 the stand 1 of a mill saw is provided with a stroke guide 2 for a saw frame 3 that can be driven to and fro by means of a slider-crank drive 4. The parallel saw blades 5 of the saw frame 3 are gripped conventionally into a frame, which is adjustably cantilevered in the saw frame 3. For guiding the stock to be cut a feed conveyor 6 is provided, which consists of driven conveyor rolls 7 arranged upstream and downstream of the saw frame 3. The stock to be cut is against conveyor rolls 7 by pressure rolls 8, which can be set by adjustment cylinders 9. Contrary to conventional feed conveyors, the conveyor rolls 7 are not driven by the slider-crank drive 4, but by separate motors 10 connected thereto by chain drives 11, as shown in FIG. 2. These motors 10, designed as gear motors, are controlled by a controlling system 12, comprising a computer unit 13 according to FIG. 2 which transmit desired values to the position controllers 14 for the motors 10. On the basis of these desired values the motors 10 are controlled according to the feed requirements by a desired value actual-value adjustment. The selection of desired value is effected by control programs stored in the program memories 15 and 16. The feed conveyor 6 performs one conveying step by the motors 10, as soon as the controlling system 12 is triggered by a signal transmitter 17 for the dead center of the slider-crank drive 4 at the end of a cutting stroke.

Figure 3:
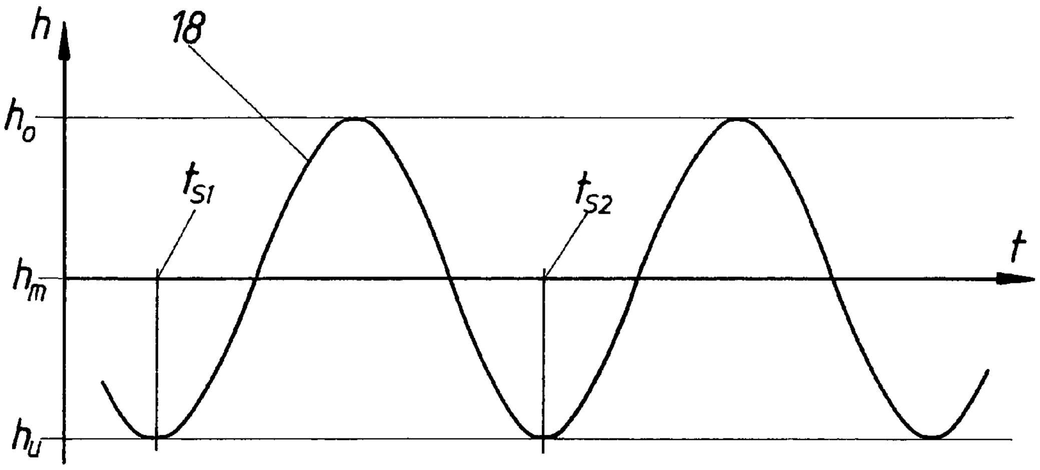
FIG. 3 depicts the stroke gradient related to time of the saw frame driven by the slider-crank drive and FIG. 4 shows the speed gradient related to time of the saw frame on the one hand, and the speed gradient related to time of the feed drive, on the other hand.
Figure 4:
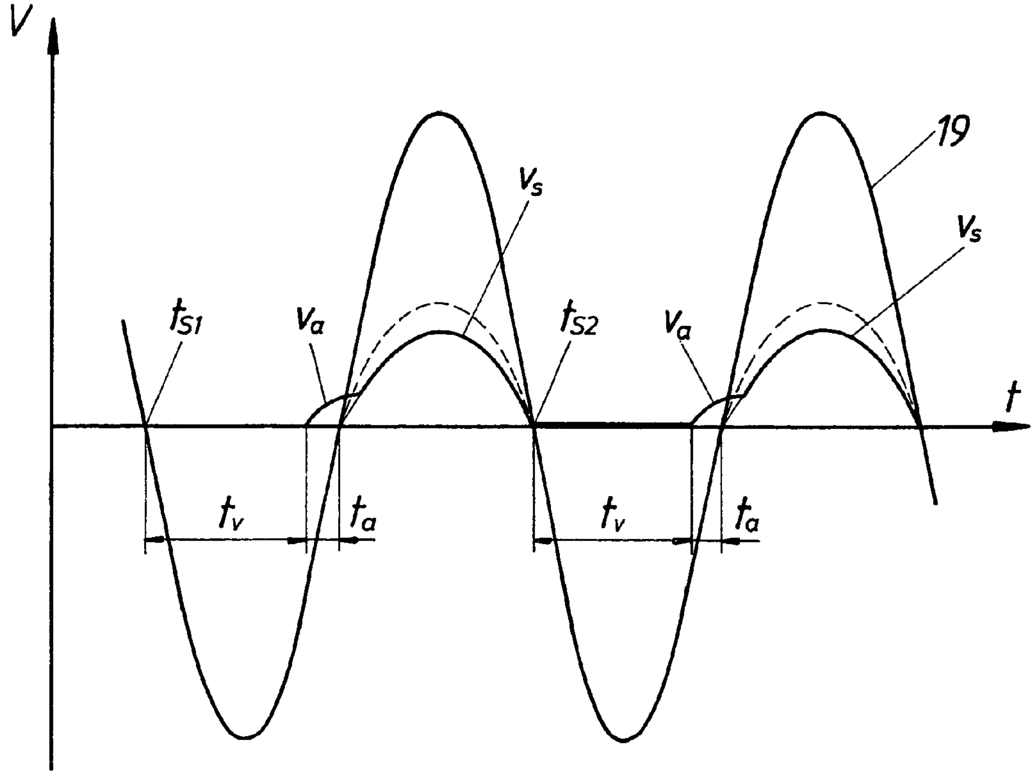

FIG. 3 and FIG. 4 explain the control sequence for the motors 10 in detail. FIG. 3 shows the gradient 18 of the stroke h of the saw frame over the time t around a mean stroke position $h_m$ between an upper dead center $h_o$ and a lower dead center $h_u$, with the cutting stroke in cutting direction of the saw blades ensuing from the downward movement of the saw frame 3 from the upper dead center $h_o$ to the lower dead center $h_u$. Due to the sinusoidal stroke gradient 18 related to time of the saw frame 3, the speed gradient related to time for the saw frame 3 corresponds with the curve 19 of the FIG. 4. The speed v above the time base t is equivalent to the cutting speed of the saw blades 5 during the cutting stroke.

To be able to ensure a uniform chip thickness over the cutting stroke, the feed conveyor 6 must be driven in phase with the saw frame 3. An appropriate rate of feed $v_s$ for the feed conveyor 6 is depicted in FIG. 4, from which it can also be inferred that, according to the speed gradient 19 below the time base t, there must not be any feed of the stock to be cut during the return stroke of the saw frame 3.

The cantilever of the saw blades 5 necessary for the disengagement of the saw blades 5 during the return stroke requires that the disengagement of the saw blades 5 against the bottom of the cutting grooves must be overcome first, before the saw blades 5 are able to engage the stock to be cut. This means that the feed conveyor 6 must be driven to lead in such a way that the stock to be cut is set to cutting position to the saw blades 5 at the beginning of a cutting stroke. To this end, the stock to be cut must be conveyed, prior to the cutting stroke, by a distance equivalent to the disengagement of the saw blades 5, which distance is determined by the adjusted cantilever, so that the necessary setting of the stock to be cut can be ensured at an appropriate speed gradient $v_a$ by the feed drive.

As the time period required for the advanced setting of the stock to be cut is determined at a speed gradient $v_a$ selected by the program, only a lead time $t_v$ needs to be allowed to control, after response of the signal transmitter 17 at the time $t_{s1}$ in the lower dead center $h_u$ of the saw frame 3, the motors 10 according to the speed gradients $v_a$ and $v_s$ which are ensured by the control programs in the memories 15 and 16. Each time the controlling system 12 is triggered by the signal transmitter 17 at the time $t_{s1}$ the feed drive is actuated according to the speed gradients $v_a$ and $v_s$ after a lead time $t_v$, whereby the desired intermittent feed drive is ensured. As can be seen in FIG. 3 and FIG. 4, the time control of the motors 10 depends on the stroke frequency of the slider-crank drive. Therefore the speed gradient $v_s$ must be adapted to the respective stroke frequency, just as it is also necessary to adapt the lead time $t_v$ to the stroke frequency. For this purpose, the control program stored in the memory 16 that depends on the stroke frequency of the saw frame 3 is computed with the respective stroke frequency in the computer unit 13 in such a way that the respective desired values can be preset on the position controllers 14 as a function of the respective stroke frequencies. The stroke frequency proper is input in the computer unit 13 by an averaging unit 20, so that possible variations can be compensated.

To be able to adapt the rates of feed to the various requirements, the parameters to be preset for this purpose can be entered in the controlling system 12 by an input unit 21. Via these parameters, for instance, the amplitudes of the speed gradients $v_s$ may be varied, as shown in broken lines in FIG. 4. Via appropriate parameters, however, it is also possible to allow for variations in the cantilever of the saw blades 5 to adapt the speed gradient $v_a$ accordingly.

The invention claimed is:

1. A mill saw comprising (a) a saw frame comprising parallel saw blades cutting only in a stroke direction, (b) a slider-crank drive imparting cutting strokes to the saw frame at a given frequency, (c) a feed conveyor for feeding stock to be cut by the saw blades in a feed direction, (1) the saw blades being cantilevered in the feed direction, and (2) the saw frame moving at a cutting speed relative to the stock during the cutting strokes, said slider crank drive causing said saw frame cutting speed to have a sinusoidal velocity profile, (d) at least one motor separated from the slider-crank drive for intermittently driving the feed conveyor conveying step-by-conveying step during the cutting strokes of the saw frame in dependence on the cutting speed, (e) a controlling system connected to the at least one motor, the controlling system comprising (1) a stored computer control program for the conveying steps, said program controlling a speed of the feed conveyor to correlate with the sinusoidal velocity profile of the saw frame cutting speed during the cutting strokes of the saw frame, and (f) a signal transmitter connected to the controlling system, the signal transmitter transmitting an electronic signal indicating a preset position of rotation of the slider-crank drive to the controlling system.

2. The mill saw of claim 1, wherein the signal transmitter consists of a sensor for the dead center of the slider-crank drive at an end of the cutting strokes.

3. The mill saw of claim 1, further comprising an input for various control parameters connected to the controlling system.

4. The mill saw of claim 1, comprising two of said motors separately controlled by the controlling system, the motors being arranged, respectively, upstream and downstream of the saw frame in the feed direction.

5. A mill saw comprising (a) a saw frame comprising parallel saw blades cutting only in a stroke direction, (b) a slider-crank drive imparting cutting strokes to the saw frame at a given frequency, (c) a feed conveyor for feeding stock to be cut by the saw blades in a feed direction, (1) the saw blades being cantilevered in the feed direction, and (2) the saw frame moving at a cutting speed relative to the stock during the cutting strokes, (d) at least one motor separated from the slider-crank drive for intermittently driving the feed conveyor conveying step-by-conveying step during the cutting strokes of the saw frame in dependence on the cutting speed, (e) a controlling system connected to the at least one motor, the controlling system comprising (1) a stored computer control program for the conveying steps adapted to the frequency of the cutting strokes, the stored control program comprising a first memory for a control program dependent on the speed of the slider-crank drive and a second memory independent thereof for feeding the stock to be cut in dependence on a saw blade disengagement determined by the cantilever of the saw blades, and (f) a signal transmitter connected to the controlling system, the signal transmitter transmitting an electronic signal indicating a preset position of rotation of the slider-crank drive to the controlling system.

* * * * *